United States Patent
Jacobson et al.

(10) Patent No.: US 6,856,283 B2
(45) Date of Patent: Feb. 15, 2005

(54) METHOD AND APPARATUS FOR A POWER SYSTEM FOR PHASED-ARRAY RADAR

(75) Inventors: Boris Solomon Jacobson, Westford, MA (US); John McGinty, Hudson, MA (US); Paul Christian Thomas, Leominster, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/376,543

(22) Filed: Feb. 28, 2003

(65) Prior Publication Data

US 2004/0257271 A1 Dec. 23, 2004

(51) Int. Cl.[7] ............................. H01Q 3/22; H01Q 3/26; G01S 13/00; G01S 7/02
(52) U.S. Cl. .......................... 342/368; 342/82; 342/89; 342/175
(58) Field of Search ......................... 342/350, 367–377, 342/73–82, 89, 175, 203; 315/137–148, 160–177, 246, 250, 251–266, 268, 274, 276–287; 455/78; 343/895

(56) References Cited

U.S. PATENT DOCUMENTS

| | | | | |
|---|---|---|---|---|
| 3,740,640 A | * | 6/1973 | Ravas et al. | 342/175 |
| 4,319,246 A | * | 3/1982 | Fitz | 342/175 |
| 4,737,899 A | * | 4/1988 | Lorec | 342/203 |
| 4,814,770 A | * | 3/1989 | Reger | 342/175 |
| 5,023,634 A | * | 6/1991 | Nishioka et al. | 342/368 |
| 5,065,300 A | | 11/1991 | Jacobson et al. | |
| 5,151,852 A | | 9/1992 | Jacobson et al. | |
| 5,264,736 A | | 11/1993 | Jacobson | |
| 5,602,554 A | * | 2/1997 | Cepas et al. | 342/368 |
| 5,834,925 A | | 11/1998 | Chesavage | |
| 6,108,526 A | * | 8/2000 | van der Plas | 455/78 |
| 6,181,295 B1 | * | 1/2001 | Sharaiha et al. | 343/895 |
| 6,424,552 B1 | | 7/2002 | Jacobson | |

\* cited by examiner

*Primary Examiner*—Bernarr E. Gregory
(74) *Attorney, Agent, or Firm*—David E. Huang, Esq.

(57) ABSTRACT

A power system for a phased-array radar system powers an antenna array with a single multiphase transformer. A plurality of AC/DC converters are connected in parallel between the single multiphase transformer and a common bus. The common bus is balanced with respect to chassis ground reducing noise and improving operating safety of the antenna. The AC/DC converters each has a multi-sloped characteristic which enables the converters to share power by modifying output impedance as a function of load without external control signals. The system also has several layers of fault detection.

33 Claims, 12 Drawing Sheets

METHOD AND APPARATUS FOR A POWER SYSTEM FOR PHASED-ARRAY RADAR

BACKGROUND OF THE INVENTION

Radar is an acronym for "radio detection and ranging." A radar system can be used both to detect position and to detect the movement of objects. Radar systems generally operate in the ultra-high-frequency (UHF) or microwave part of the radio-frequency (RF) spectrum. Radar systems are widely used in air-traffic control, aircraft navigation, marine navigation and in detection systems used in military applications. Radar can also track storm systems, because precipitation reflects electromagnetic fields at certain frequencies.

Radar systems use antennas to receive or to send radar signals. In general, an antenna is a device that converts radio-frequency fields into alternating current (AC) or vice-versa.

In electronic signaling, phase is a definition of the position of a point in time (i.e., an instant) on a waveform cycle. A waveform is the representation of how AC varies with time. One example of an AC waveform is the sine wave. The sine wave represents energy concentrated at a single frequency. For example, household utility current has a general sine waveform at 60 Hz. A complete cycle is defined as 360 degrees of phase. Phase can also be an expression of relative displacement between or among waves having the same frequency.

Phase difference, also called phase angle, in degrees is conventionally defined as a number greater than −180, and less than or equal to +180. Leading phase refers to a wave that occurs "ahead" of another wave of the same frequency. Lagging phase refers to a wave that occurs "behind" another wave of the same frequency. When two signals differ in phase by −90 or +90 degrees, they are said to be in phase quadrature. When two waves differ in phase by 180 degrees (−180 is technically the same as +180), the waves are said to be in phase opposition. Phase is sometimes expressed in radians rather than in degrees. One radian of phase corresponds to approximately 57.3 degrees.

A phased-array radar antenna is a collection of many small radar antennas that are geometrically positioned so that their outputs and received signals are correlated in terms of phase. In a phased-array radar system, beamsteering or beamforming, i.e., control of the radar transmission or reception direction, is electronic instead of mechanical. Electronic control has advantages over mechanical control in that beamsteering can be performed more quickly resulting in faster scan rates than in mechanical systems. Also, a phased-array radar antenna is more reliable as there are no mechanical positioning devices to fail.

The phased-array radar system typically has an array of antenna elements each connected to radar signal generation and reception circuitry. Each antenna element radiates when supplied with radar frequency power ("RF drive signals"), and responds to incident radiation of appropriate frequency by producing a received signal. Received signals are down-converted to intermediate frequency (IF) by mixing with a local oscillator (LO) signal. In transmission, the output radar beam direction is controlled by the phase relationship between the RF drive signals to individual antenna elements in the array. If the RF drive signals are all in phase with one another, the output beam direction is perpendicular to the phased-array where the antenna array is a planar system. If the drive signal phase varies linearly with antenna element position across the array, the output beam is inclined at an angle to the array. Altering the rate at which phase varies with position alters the output beam inclination and provides the received signal phase as a function of array position. This may be achieved by varying the LO phase across the array, or by inserting differing delays into received signal paths.

In both reception and transmission, control of signal phase at each individual array element is a prerequisite to viable phased-array radar. Further, it is desirable to provide clean RF drive signals, that is, signals having a minimum amount of noise, because accurate antenna positioning depends on the RF drive signals. Further, it is desirable to have a reliable power supply for antenna reliability particularly since phased-array radar is used in critical situations.

SUMMARY OF THE INVENTION

Conventional phased-array radar technology does not provide power systems capable of providing full power to a single section of the antenna array when needed, nor does it provide power systems having effective current sharing among power supplies. In one conventional radar power system, each pair of antenna sections shares a transformer. This arrangement has several disadvantages including that full prime power is not available to all antenna sections. For example, where two input transformers provide two independent power channels and supply power to four sections of antenna, only half of the total system power is available to each antenna section. This conventional arrangement works well with an average power system that operates with low duty cycle, high repetition rate pulses and that does not draw pulsed power from a source. In the case of the peak power system operating with long, high duty cycle pulses, the conventional arrangement does not enable concentrating full prime power on one specific section of the antenna. A second disadvantage of the conventional arrangement is that there is inadequate current sharing of parallel redundant power supplies. A power supply feeding a common bus in the conventional system uses an adjustable reference for the voltage regulator loop to implement current sharing. Signals that may adjust the reference include current limit and minimum current. Current sharing between three parallel supplies using this approach is not optimum and can be as unbalanced as, for example, 68% load from the first power supply, 31% load from the second power supply, and 1% load from the third power supply. This approach results in imperfect current sharing, and therefore more power supplies are required.

Embodiments of the present invention significantly overcome such deficiencies and provide methods and apparatus for a power system for phased-array radar with a single multiphase transformer, a plurality of AC/DC converters and a balanced common bus. The plurality of AC/DC converters are connected in parallel between the single, multiphase transformer and the common bus. The common bus is balanced with respect to chassis ground reducing noise and improving operating safety. The AC/DC converters share power by modifying output impedance as a function of load without external control signals. The system also has several layers of fault detection.

In one embodiment of the invention, the power system uses one multiphase transformer and a plurality of AC/DC converters to feed a common 300 V DC bus. The converters are connected in parallel to the common bus. The common bus feeds all sections of the antenna array. The bus is balanced at +150 V/−150 V with respect to chassis ground. The multiphase transformer is rated for a maximum simultaneous load for all sections of the antenna array. The converters operate independently and share power without common internal or external control signals. The independent operation of the converters improves reliability of the power system because a source of single point failures is eliminated from the power system. Further, the optimized power sharing reduces the total number of converters in the power system thus further improving power system reliability. The shared bus enables the power system to apply full power to a single antenna section when needed without oversizing individual power system components. Therefore, the power system is functional in both average load and in peak load systems.

The AC/DC converters share power on the common bus using a technique involving a control circuit having at least three feedback loop controllers. Each AC/DC converter has a control circuit including a voltage loop controller, a power loop controller, and a current loop controller. At light loads, the voltage loop controller runs the converter. At higher loads, the output voltage drops out of regulation, the power loop controller takes over and the converter provides fundamentally constant power output. In the constant power mode, the output impedance of the converter appears similar to the output impedance of a loss-less resistor. If the load continues to increase and exceeds the rated current of the AC/DC converter, the third, current loop controller takes over. The three controllers provide a multi-sloped output characteristic to the common bus enabling power sharing without a centralized control signal.

When the radar array is in an idling state or when the radar array is drawing a minimum load, a single converter, the converter having the highest output voltage, operates in the essentially constant voltage mode and provides the full load to the antenna array. The other power supplies connected to the common bus are blocked by reverse-biased diodes. Once the radar array begins transmitting, the single converter reaches its power limit and transitions into the constant power mode. Output voltage in the constant power mode drops below a constant power mode regulation point and other converters start feeding the common bus. The rate of voltage decline depends on the value of the capacitance connected to the common bus. The slope of the output characteristic is steep in the constant power mode, and therefore the output power is substantially equally divided between the converters. Each converter has a constant power limit that is not exceeded.

The common DC bus provides power to all antenna sections. Therefore, any single antenna section can, when needed, draw full system power. The common bus is balanced with respect to chassis ground. In one embodiment of the invention, the bus has a +150 V line and a −150 V line. An advantage of the balanced bus is reduced ripple and noise component caused by common-mode current flowing through both +150 V and −150 V conductors and returning through the chassis ground conductor. Another advantage of the balanced distribution is the reduced voltage between conductors and chassis ground that reduces probability of corona and arcing in densely packaged assemblies operating in humid environments. The balanced high voltage bus has a ground fault protection circuit that can detect and differentiate between line-to-line and ground faults that occur in different parts of the system on the same side of an isolation boundary.

In general, where there is a group of converters connected in parallel to a common load, it is difficult to distinguish internal faults (that is, power converter faults) from external faults (that is, load faults). A line-to-line ("short circuit") failure, whether internal or external to a converter, can be easily detected and isolated. Each converter has an over-current protection circuit that detects that the converter has a short circuit fault. The control circuit of the failed converter then shuts the unit off. The converters in the present invention each have isolating diodes that isolate internal faults from the common bus under specific circumstances. If a converter has an internal fault prior to the isolating diodes, the voltage across the converter's output prior to the isolating diodes goes to zero, and this fault is isolated from the common bus by the diodes because the diodes are reverse biased. In the event of an over-load on the common bus, all the converters shut down indicating a common bus fault.

Line-to-ground ("ground") faults, however, present a detection problem because ground fault current is limited and does not activate the over-current protection of the individual converter. If a converter feeding the common bus has an internal ground fault, the converter shifts the whole common bus from +150 V and −150 V to either 0 V and −300 V or 0 V and +300 V. All converters feeding the bus report a fault making it difficult, without additional information, to detect and isolate the failed unit. In the present invention, each converter has a time delay component which delays fault signals external to individual converters. The time delay component is a common-mode ("balun") filter at the output of each power supply connected to the bus. A ground fault detection circuit monitors voltage across a ground fault sensing resistor. The filter's L/R time constant allows differentiating between ground faults at the individual supply output and at the common bus. In the case of failure of a converter output component, its ground fault signal has a faster rate of rise compared to the same signal from a good unit. Once the faster signal identifies the failed unit, the power system controller takes the failed converter off the bus, and the power system resumes normal operation. The total fault current equals to the sum of current from all units connected to the bus.

In the event of a load ground fault, every converter generates a substantially similar slow-rising signal and the power system controller does not shut down any units. Each converter provides a limited amount of ground fault current that does not interrupt its normal operation. The total current flowing through the ground fault equals to the sum of currents of individual power supplies. Thus, protective devices (fuses or circuit breakers) are sized to interrupt the total ground fault current provided by all power supplies connected to the common bus. A sensing resistor limits the ground fault current below the power supply over-current limit and above the fraction of the minimum current required for fault isolation. In an alternative embodiment of the invention, voltage-clamping devices such as zener diodes or crowbar action devices such as thyristors are connected from the chassis ground to +150 V and from the chassis ground to −150 V before the isolating diodes. Zener diodes and the crowbar action devices detect and isolate ground faults, but their operation relies on creating a momentary short circuit at the bus that can result in a sever transient or even a catastrophic fault of the power system.

An input/output common bus fault detector monitors power delivered to and taken from the common bus. The sum of input and output currents to the common DC bus is monitored using Hall effect sensors. Since energy storage capacitors are decoupled from the bus by diodes, at any instant in time, the input and output current should be approximately equal. A ground fault on the common bus manifests itself as a difference between input and output current and the fault can be detected in, for example, a few microseconds.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views.

DETAILED DESCRIPTION

A power system for a phased-array radar system powers an antenna array with a single multiphase transformer. A plurality of AC/DC converters are connected in parallel between the single multiphase transformer and a common bus. The common bus is balanced with respect to chassis ground reducing noise and improving operating safety of the antenna. Each AC/DC converter has a multi-sloped characteristic which enables the converters to share power by modifying output impedance as a function of load without external control signals. The system also has several layers of fault detection.

Figure 1:
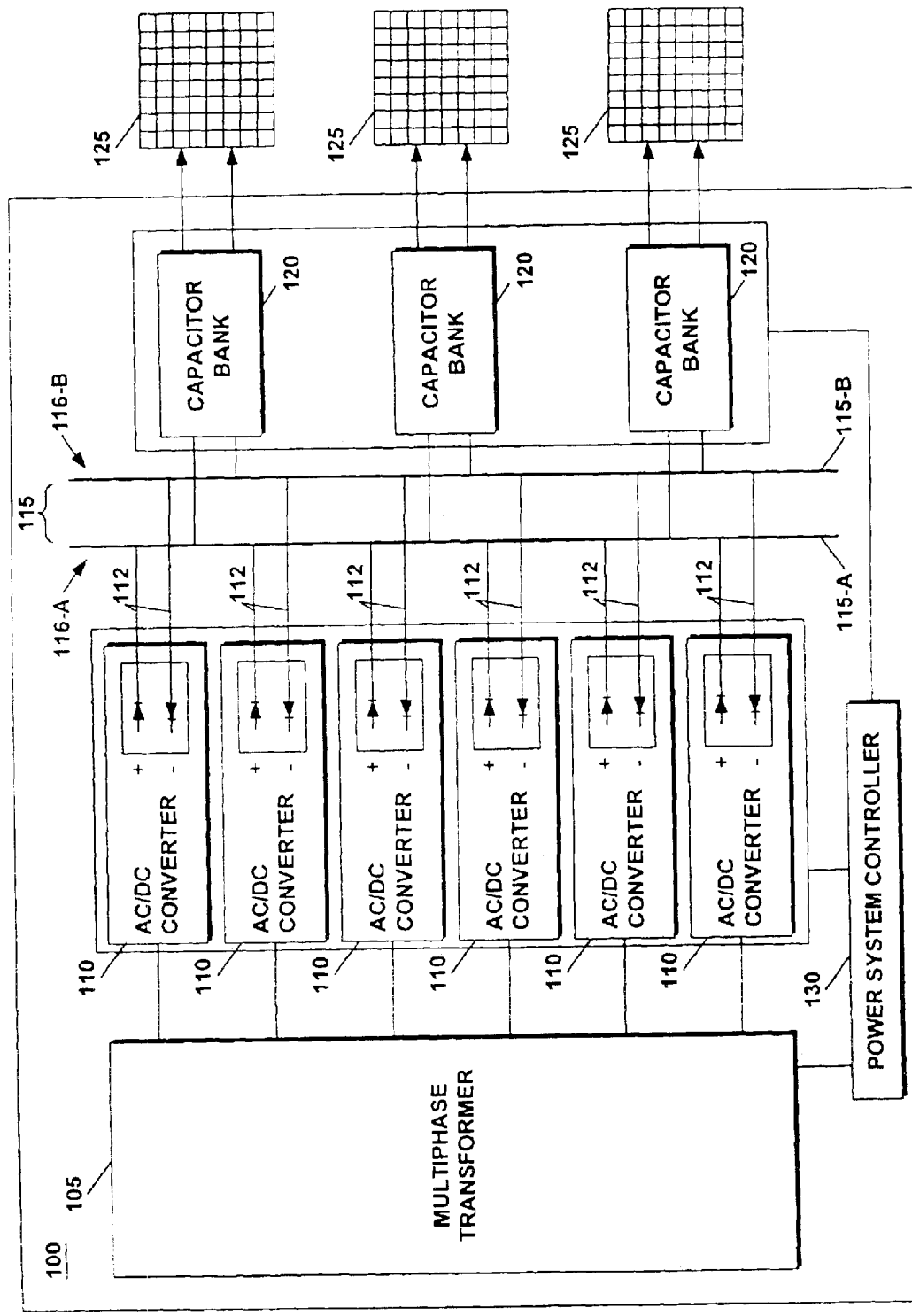
FIG. 1 is a block diagram of a phased-array radar system according to principles of the present invention.

FIG. 1 is a block diagram of a phased-array radar system according to principles of the present invention. The phased-array radar system has a power system 100 and an array of antenna sections 125. The power system 100 includes a multiphase transformer 105, a plurality of AC/DC converters 110, a common bus 115, a plurality of capacitor banks 120 and a power system controller 130. The AC/DC converters 110 are coupled in parallel between the multiphase transformer 105 and by a pair of conductor lines 112 to the common bus 115. Each antenna section 125 is coupled to the common bus 115 through one of the capacitor banks 120. The capacitor bank 120 is a bank of energy-storing capacitors providing power when the load drops below the a constant voltage regulation point set in the converters 110 as will be described later below.

During operation, the multiphase transformer 105 feeds the AC/DC converters 110. The AC/DC converters 110, also referred to as power supplies, feed the common bus 115. The common bus 115 feeds a plurality of antenna sections 125.

In one embodiment of the invention, the multiphase transformer 105 is rated for a maximum simultaneous load for all sections of the antenna array 125. An example of a multiphase transformer which is suitable for use as the multiphase transformer 105 is disclosed in U.S. Pat. No. 6,424,552, the teachings of which are hereby incorporated by reference in their entirety. The invention is not limited to this transformer. The use of other types of multiphase transformers is considered to be within the scope of the invention.

The common bus 115 is balanced with respect to chassis ground. That is, the common bus 115 includes a first bus line 115-A which carries a first power supply signal and a second bus line 115-B which carries a second power supply signal 116-B, and the magnitude of voltage difference between each of the two signals 116-A, 116-B lines and ground 200 is the same. In one embodiment of the invention, the common bus 115 is a 300 V DC bus is balanced at +150 V/−150 V with respect to the power system chassis ground 200. An advantage of the balanced bus is reduced ripple and noise in the bus signal caused by common-mode current flowing through the lines of the bus 115 and returning through the chassis ground conductor. Common-mode current is an unwanted current flowing through both lines 115-A and 115-B and returning through the chassis. Common-mode current is caused by power system components that operate with pulsed or periodically switching voltage. The magnitude of the common-mode current is proportional to the rate of voltage change across a component and the value of parasitic capacitance between the component and the chassis ground. The greater the difference between the impedances of the lines 115-A and 115-B, the larger the common-mode voltage noise signal generated by the common-mode current. Balancing the bus with respect to ground reduces the common-mode component of the voltage noise at the load.

Another advantage of the balanced distribution for the common bus is the reduced voltage between conductors (i.e., the bus lines 115-A and 115-B) and chassis ground that reduces probability of corona and arcing in densely packaged assemblies particularly in systems operating in humid environments. The shared bus 115 enables the power system to apply full power to a single antenna section when needed without oversizing individual power system components.

The AC/DC converters 110 operate independently and are optimized because they share power, without internal or external control signals, by modifying output impedance as a function of load. The AC/DC converters 110 are, for example, 16 kW converters. The independent operation of the converters 110 improves reliability of the radar system because the failure of one converter does not drive the whole system to failure. Further, the optimized use of power reduces the number of converters needed thus freeing bus locations for redundant converters and further improving power system reliability.

Figure 2:
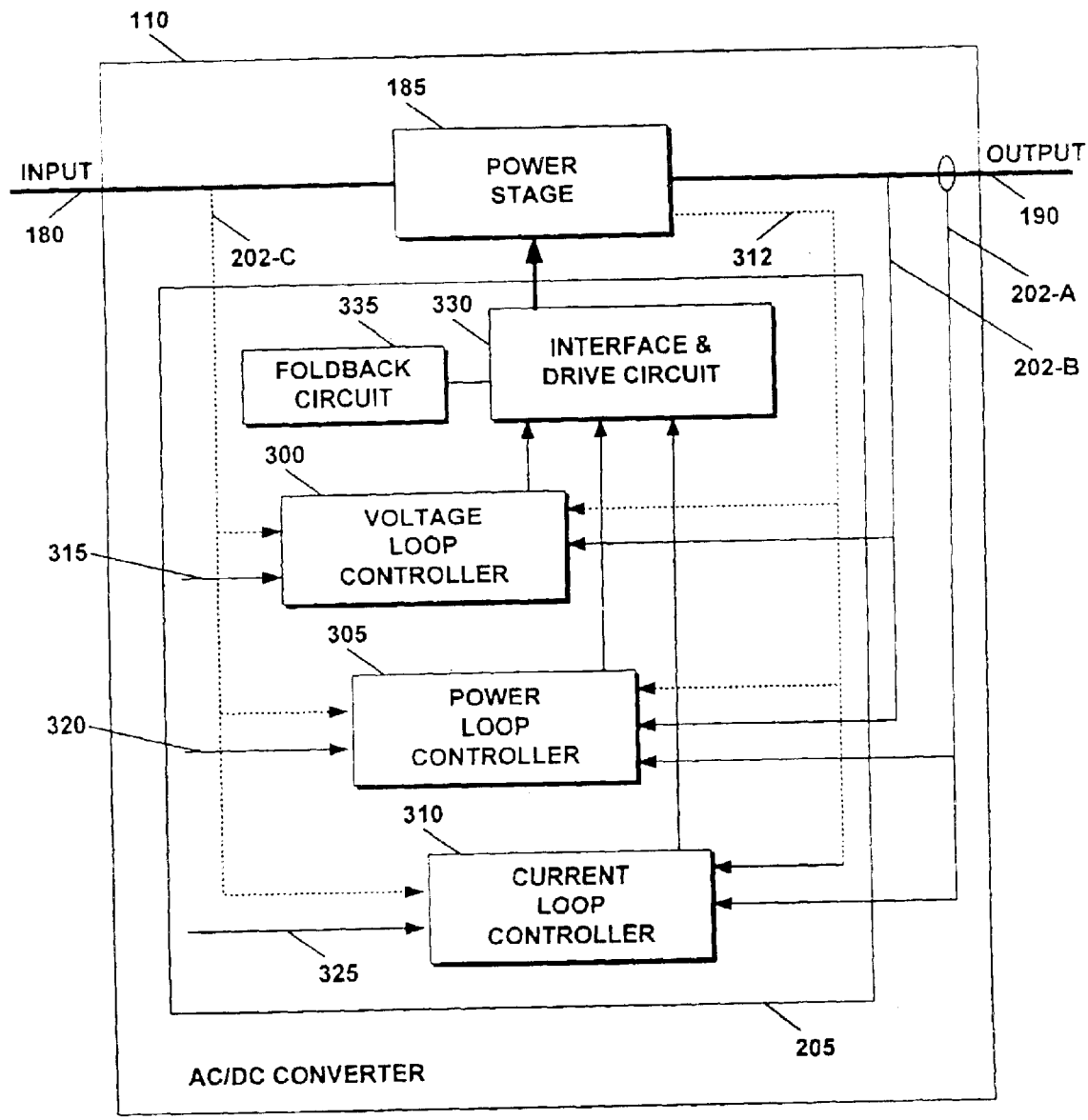
FIG. 2 is a block diagram of one of the AC/DC converters of FIG. 1.

FIG. 2 is a block diagram of one of the AC/DC converters of FIG. 1. The AC/DC converter 110 has an input 180, a power stage 185, an output 190 and a control circuit 205. The input 180 provides an input voltage to the power stage 185 that performs the power conversion and provides an output voltage at the output 190. The control circuit 205 has an interface and drive circuit 330 (hereinafter, the drive circuit 330) and outer loop feedback controllers 300, 305, 310 taking a plurality of feedback signals 202A, 202-B, 312, an input voltage feedforward signal 202-C and a foldback circuit 335. A voltage loop controller 300 takes an output voltage signal 202-B from the converter output 190. The voltage loop controller 300 also takes an inner feedback signal 312 from the power stage 185, an input voltage feed-forward signal 202-B from the converter input 180, and a voltage reference signal 315 defined in the converter circuit 205. A power loop controller 305 takes the output voltage signal 202-B from the converter output 190, an output current signal 202-A from the converter output 190, the inner feedback signal 312 from the power stage 185, the input voltage feed-forward signal 202-C from the converter input 180, and a power reference signal 320 defined in the converter circuit 205. The current loop controller 310 takes the output current signal 202-A from the converter output 190, the inner feedback signal 312 from the power stage 185, the input voltage feed-forward signal 202-C from the converter input 180, and a current reference signal 325 defined in the converter circuit 205. The feedback loop controllers 300, 305, 310 enable the converter 110 to share power on the common bus 115 with the other converters 110. In sharing power, each converter 110 supplies substantially the same amount of power as each other converter 110. The input voltage feed-forward signal 202-C from the converter input 180 and the inner feedback signal 312 from the power stage 185 improve stability characteristics of the voltage, power and current outer feedback loops controlled by the controllers 300, 305, 310.

During operation, the converter output current signal 202-A and output voltage signal 202-B are sent to the control circuit 205. Using the drive circuit 330, the control circuit 205 activates only one controller 300, 305, 310 at one time and so only one of the feedback loops formed by the signals 202-A, 202-B, and controllers 300, 305, 310 "controls" the converter 110 at any moment in time. When the antenna array 125 is in an idling state or when the radar array 125 is drawing a minimum load (i.e., a minimum amount of power), a single converter 110, the converter having the highest output voltage, here, for example converter 110-1, provides the full load (i.e. a maximum amount of power) to the antenna array 125. While FIG. 2 shows one embodiment of the converter 110, it will be understood that various modifications may be made without departing from the spirit and scope of the invention.

The AC/DC converters 110 operate to provide power to the antenna array. When the antenna array 125 is idling or when its power needs are low, only one converter 110 is able to supply all the power needed by the antenna array 125. When the antenna array 125 is transmitting, its power needs are greater than when the antenna array 125 is in the idle mode, and more than one converter 110 is needed to supply power to the antenna array 125. The present invention enables the converters to adjust themselves to the power demands made on them by the antenna array 125 in order to balance the power provided among the converters.

Figure 3:
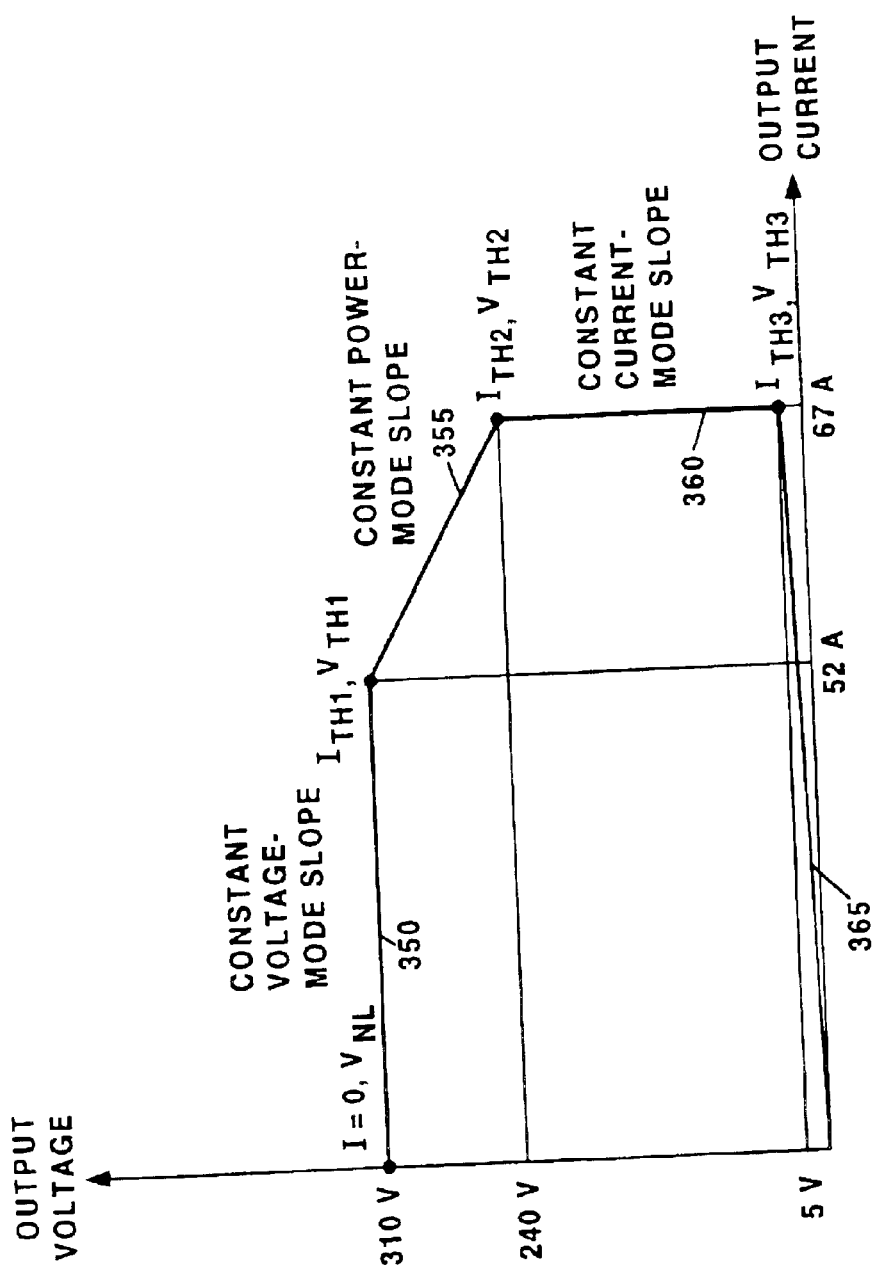
FIG. 3 is a graph of the power output of a first AC/DC converter of FIG. 2 exhibiting a multi-sloped characteristic.

FIG. 3 is a graph of the output voltage of the converter 110 as a function of its output current. Unless stated otherwise, in the following description, output voltage and output current are average output voltage and average output current respectively.

The function in FIG. 3 exhibits a multi-sloped characteristic. The general slope definition of the curve shown in FIG. 3 is the increment of the output voltage ΔV divided by the increment of the output current ΔI. The multiple slopes include voltage-mode slope 350 where the antenna array 125 is in idle mode and its power needs are low, a constant power-mode slope 355 where the antenna array 125 is transmitting and its power needs are great, a current-mode slope 360, and a foldback-mode slope 365. The last two slopes, the current-mode slope 360 and the foldback-mode slope 365 pertain to start up or overload conditions of the power system. For the characteristic shown in FIG. 3 where slope 350=0 (constant voltage) and slope 360=∞ (constant current), any set of slopes that satisfies the conditions $0<I_{TH1}<I_{TH2} \leq I_{TH3}$ and $0 \leq V_{TH3}<V_{TH2}<V_{TH1} \leq V_{NL}$, is within the scope of this invention, where $I_{TH1}$ is a first current threshold and $V_{TH1}$ is a first voltage threshold between voltage mode operation and constant power-mode operation of the converter 110; $I_{TH2}$ is a second current threshold and $V_{TH2}$ is a second voltage threshold between constant power-mode operation and current-mode operation of the converter 110; $I_{TH3}$ is a third current threshold and $V_{TH3}$ is a third voltage threshold between current-mode operation and foldback-mode operation of the converter 110; and $V_{NL}$ is the output voltage at no load. $I_{TH1}$ and $V_{TH1}$ are defined by the voltage loop controller 300 relative to the voltage reference signal 315. $I_{TH2}$ and $V_{TH2}$ are defined by the power loop controller 305 relative to the power reference signal 320. $I_{TH3}$ is defined by the current loop controller 310 relative to the current reference signal 325 and $V_{TH3}$ is defined by the foldback circuit 335. When the antenna array 125 is idling, typically only one converter 110-1 is needed to provide sufficient power to the antenna array. That converter 110-1 is the converter 110 having the highest output voltage among the converters 110. As the antenna array 125 transmits, the voltage at the converter 110-1 output and at the capacitor banks 120 drops as shown in the constant power slope 355 and other converters having lower output voltages than the first converter 110-1 begin feeding the antenna array 125 along with the converter 110 having the highest output voltage.

Specifically, at idling and at light loads, the voltage loop controller 300 controls the converter 110 and provides a substantially constant output voltage at, for example 310 V, as shown in FIG. 3 in the constant voltage slope 350. When the output voltage feedback signal 202-B coming to the voltage loop controller 300 drops below the voltage reference signal 315 because the load on the bus 115 has increased, control of the converter 110 shifts to the power loop controller 305 that maintains nearly constant power at the output of the converter 110. That is, typically when the radar array begins transmitting, the converter 110 reaches its power limit and transitions into the constant output power mode regulated by the power loop controller 305. The power loop controller 305 controls the converter 110 enabling it to adjust voltage and current to provide a substantially constant output power as shown by the constant power slope 355 in FIG. 3. The power-mode slope shown in FIG. 3 is fixed, providing an approximation of the constant power function. It will be understood that other implementations of the constant power mode are possible including those using non-linear functions such as V*I=P where V is the output voltage, I is the output current, and P is the constant output power. The constant power is for example 16 kW. While the converter 110 is providing constant power, the output impedance of the AC/DC converter 110 appears similar to the output impedance of a loss-less resistor. As the output voltage of the converter 110 providing constant power drops, the other converters 110, which have lower output voltages than the converter 110, start feeding the common bus 115 in addition to the first AC/DC converter 110. The constant power slope 355 is steep and therefore the output power is substantially equally divided among the converters 110. As the voltage drops below the output voltage threshold $V_{TH1}$ in each converter 110 during the constant power mode, the additional converters 110 are activated. As the antenna array 125 increases its demand for power as it is transmitting, more converters 110 begin to provide power until the power capability of the power system is reached. Each converter 110 has a constant power limit set up by the power reference signal 320 that is not exceeded. At the point where the current limit that is established by the current reference signal 325 is reached, the current loop controller 310 takes over and the converter 110 transitions into the current mode. In the current mode, the converter 110 provides substantially constant current of, for example, 67 amps, as shown by the constant current slope 360. The current mode is activated when a load with storage capacitance is initially applied and thus requires charging as part of the power up cycle. This mode also performs a current limiting function when the converter is overloaded. In the event of a short circuit fault at the output, the converter 110 stays in the current mode until the output voltage drops below the threshold $V_{TH3}$. For any voltage below this level the converter 110 operates in the region of the over-current foldback mode with positive slope 365. Methods of circuit implementation of this mode are well known in the art and often involve periodic turning the converter on and off with a small duty cycle.

Figure 4:
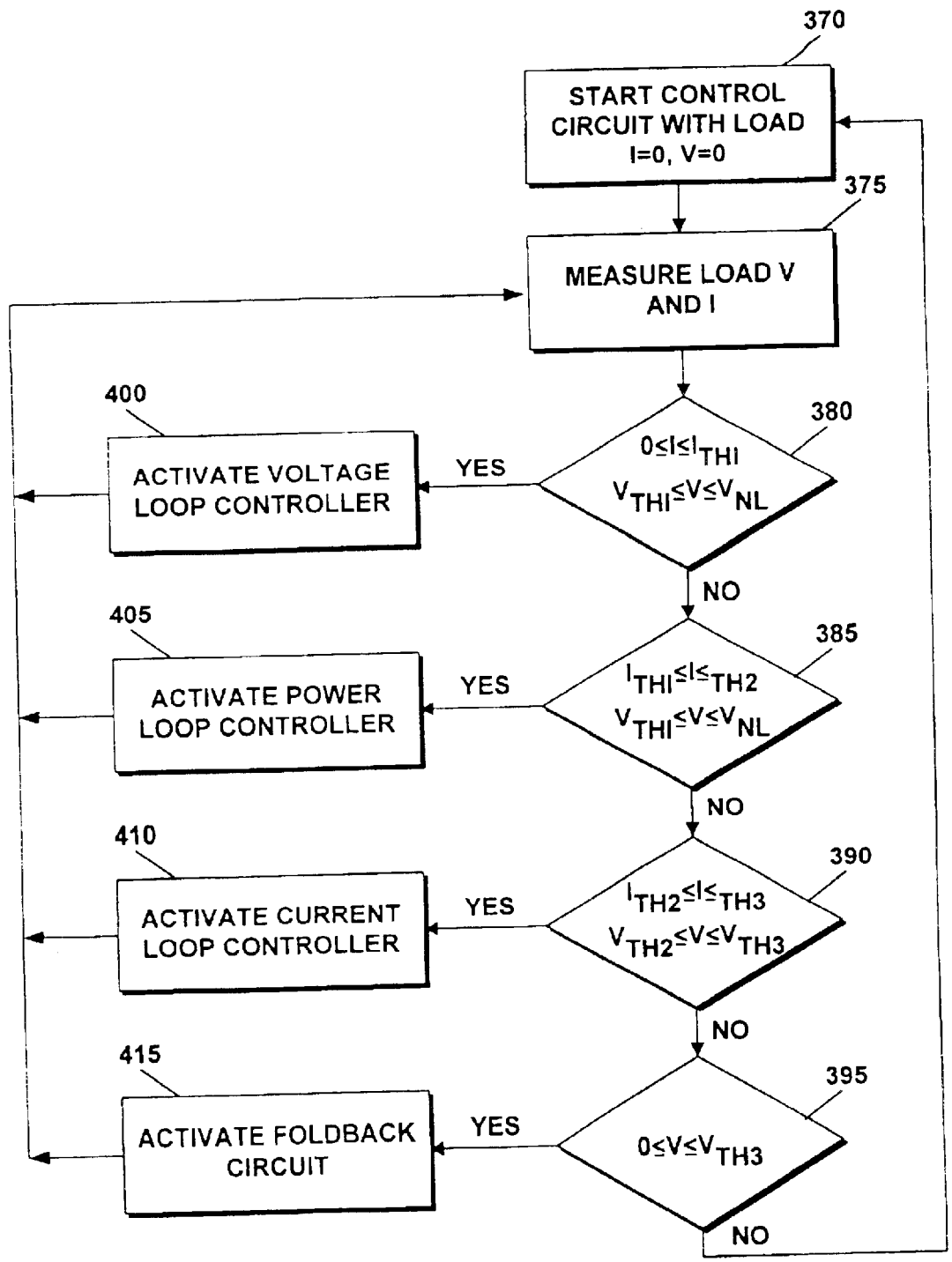
FIG. 4 is a flow chart of the operation of the AC/DC converters in supplying power according to principles of the invention.

FIG. 4 is a flow chart of the operation of the control circuit 205 of FIG. 2. At step 370, the control circuit 205 starts with output voltage V=0 and output current I=0. At step 375, the converter 110 is operating and control circuit 205 measures the output voltage V and output current I using data received as feedback signals from the converter output 190.

At step 380, the control circuit 205 compares the output voltage V and output current I to a first voltage threshold $V_{TH1}$ and a first current threshold $I_{TH1}$ respectively. If the output current I is greater than zero and less than the first current threshold $I_{TH1}$, and the output voltage V is greater than a first voltage threshold $V_{TH1}$ and less than the voltage at no load, then the control circuit 205 proceeds to step 400. At step 400, the control circuit 205 activates the voltage loop controller 300 and returns to step 375 under the control of the voltage loop controller 300. If at step 380, the output current I and output voltage V do not fall within the described current and voltage ranges, the control circuit 205 proceeds to step 385.

At step 385, the control circuit 205 compares the output voltage V to the first voltage threshold $V_{TH1}$ and the second voltage threshold $V_{TH2}$, and output current I to the first current threshold $I_{TH1}$ and to a second current threshold $I_{TH2}$. If the output voltage V is greater than a second voltage threshold $V_{TH2}$ and less than the first voltage threshold $V_{TH1}$, and the output current I is greater than the first current threshold $I_{TH1}$ and less than the second current threshold $I_{TH2}$ then the control circuit 205 proceeds to step 405 and activates the power loop controller 305 and returns to step 375 under the control of the power loop controller 305. If at step 385, the output current and voltage do not fall within the described current and voltage ranges, the control circuit 205 proceeds to step 390.

At step 390, the control circuit 205 compares the output voltage V to the second voltage threshold $V_{TH2}$ and a third voltage threshold $V_{TH3}$, and the output current I to the second current threshold $I_{TH2}$ and a third current threshold $I_{TH3}$. If the output voltage V is greater than a third voltage threshold $V_{TH3}$ and less than the second voltage threshold $V_{TH2}$ and the output current I is greater than the second current threshold $I_{TH2}$ and less than the third current threshold $I_{TH3}$, then the control circuit 205 proceeds to step 410 and activates the current loop controller 310. The control circuit 205 then returns to step 375 under the control of the current loop controller 305. In this constant current mode, the converter 110 recharge the capacitors in the capacitor banks 120. If at step 390, the output current I and voltage V do not fall within the described current and voltage ranges, the control circuit 205 proceeds to step 395.

At step 395, the control circuit 205 compares the output voltage V to the third voltage threshold $V_{TH3}$. If the output voltage V is greater than zero and less than the third voltage threshold $V_{TH3}$, then the control circuit 205 proceeds to step 415 and activates the foldback circuit 335. In alternative embodiments of the invention, the foldback mode is activated by other triggers, for example, by an instantaneous current that exceeds $I_{TH3}$. When the converter operates in the foldback mode, the output voltage is less than the third voltage threshold $V_{TH3}$ and the average output current is less than the third current threshold $I_{TH3}$. The control circuit 205 then returns to step 375 and continues operating and measuring output voltage and output current. In one implementation of the foldback mode, the control circuit periodically turns the converter on and off with a small duty cycle and a period that is relatively large with respect to the period of the switching frequency of the converter 110. For example, if the switching frequency period of the converter is 5 microseconds, the foldback period is 1 second, the on time of the converter is 100 milliseconds, the off time is 900 milliseconds and the foldback duty cycle is 10%. The control circuit 205 then returns to step 375. If at step 395, the output current and voltage do not fall within the described current and voltage ranges, then the control circuit returns to step 370, the start.

The present invention further includes fault detection components. The power system of the present invention has the capability to detect and isolate ground faults. Where the fault occurs in a converter 110, the power system 100 can take the faulty converter off-line and a redundant converter can be activated. The feature of the invention will be explained further with reference to FIG. 5.

Figure 5:
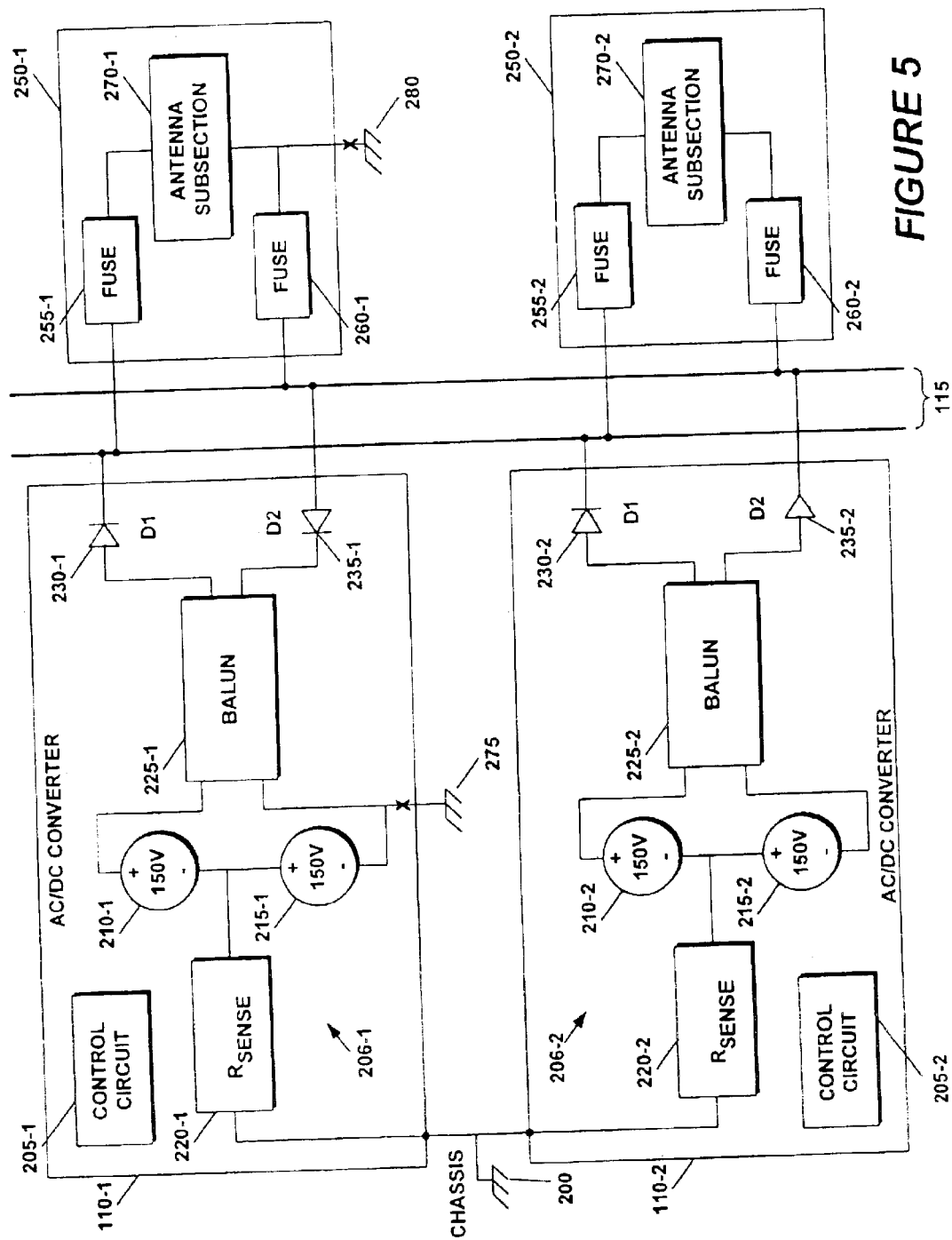
FIG. 5 is a block diagram of a pair of AC/DC converters of FIG. 1.

FIG. 5 is a block diagram of a pair of the AC/DC converters of FIG. 1 connected in parallel to the common bus 115. A first AC/DC converter 110-1 has a control circuit 205-1. The first AC/DC converter 110-1 also has an output section with a fault detection circuit 206-1 having a first voltage source 210-1, a second voltage source 215-1, a sensing resistor $R_{SENSE}$ 220-1, a common-mode inductor ("balun") 225-1, a first isolation diode 230-1 and a second isolation diode 235-1. A second AC/DC converter 110-2 also has a control circuit 205-2. The second AC/DC converter 110-2 has a second output section with fault detection circuit 206-2 having a first voltage source 210-2, a second voltage source 215-2, a sensing resistor $R_{SENSE}$ 220-2, a common-mode inductor ("balun") 225-2, a first isolation diode 230-2 and a second isolation diode 235-2. Alternative embodiments of the invention use other semiconductor devices (e.g. thyristors, and transistor-diode combinations). Further alternative embodiments use electromechanical devices instead of isolating diodes 230, 235. In one embodiment of the invention, the voltage sources are transformer windings. Both the first AC/DC converter 110-1 and the second AC/DC converter 110-2 are coupled to chassis ground 200. As an example for describing fault detection, it may be the case that the first AC/DC converter 110-1 has an internal ground fault 275.

Also connected to the common bus 115 are blocks 250-1, 250-2 representing antenna subsections 270-1, 270-2 connected to the power system 100. The antenna subsections 270-1, 270-2 are suitable for use as antenna sections 25 of FIG. 1. Each antenna subsection 270-1, 270-2 is coupled to a first fuse 255-1, 255-2 and a second fuse 260-1, 260-2 coupled to either side of the antenna section 270-1, 270-2. In alternative embodiment, the fuses could instead be circuit breakers.

Where a group of converters is connected in parallel to a common device drawing power, it is difficult to distinguish internal from external faults. A line-to-line ("short circuit") failure, whether internal or external to a converter, can be easily detected and isolated. Each converter 110 has a converter over-current protection circuit configured to detect an internal short circuit fault within the converter if such a fault exists. After detecting an internal fault, the converter controller 205 of the failed converter then shuts the unit off. The converters 110 in the present invention each have isolating diodes 230, 235 that isolate internal faults from the common bus 115 under specific circumstances. If a converter 110 has an internal fault prior to the isolating diodes 230, 235, the output voltage before the diodes 230, 235 goes to zero, and this fault is isolated from the common bus 115 by the diodes 230, 235 because they are reverse biased. In the event of an over-load on the common bus 115, all the converters 110 shut down indicating a common bus fault.

Figure 8:
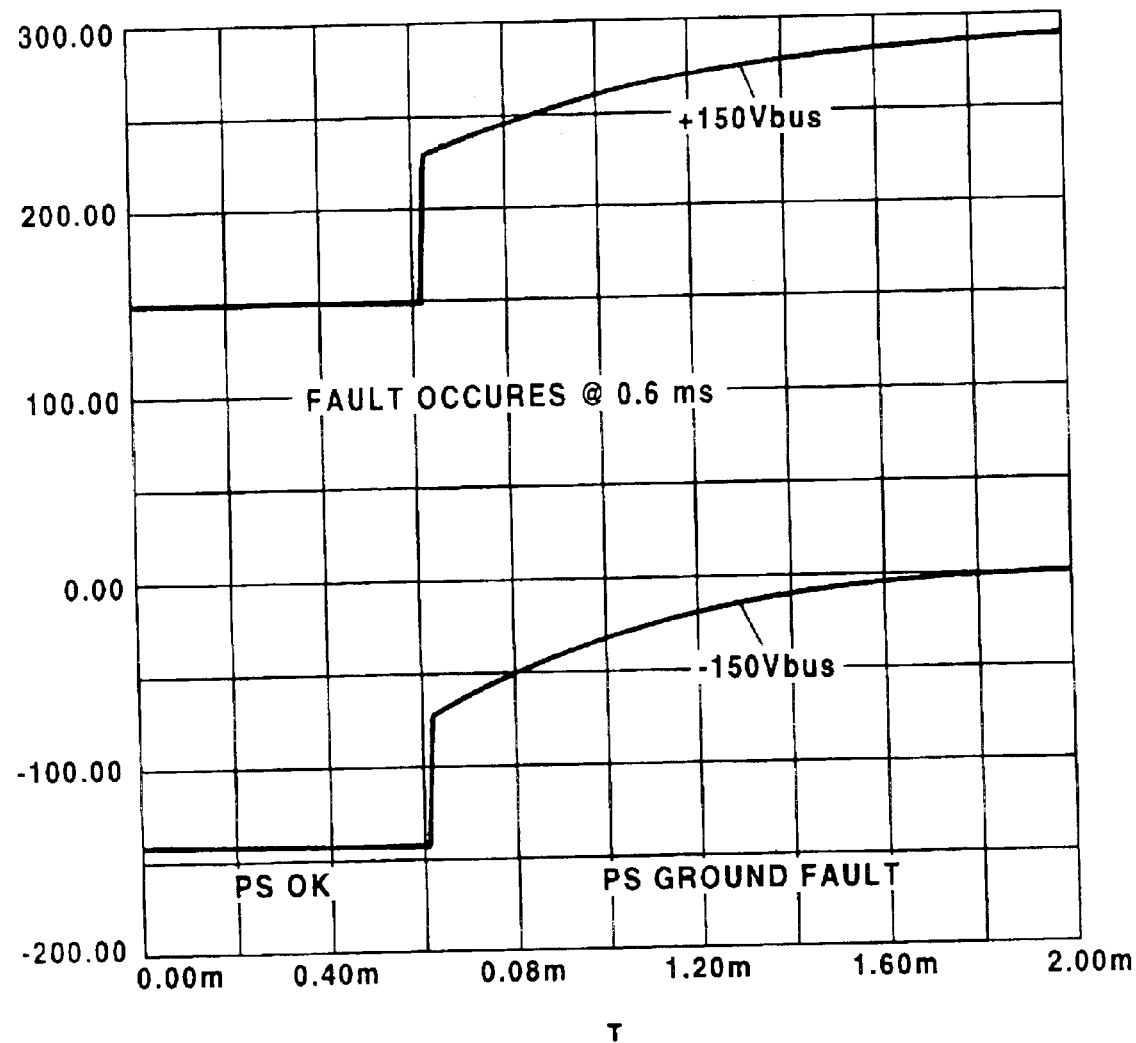
FIG. 8 is a graph of bus voltages versus time under a converter ground fault in a converter of FIG. 1.

Line-to-ground ("ground") faults 275, 280, however, present a detection problem because a single ground fault current is limited and does not activate the over-current protection of the individual converter. In the event that a converter 110-1 feeding the common bus 115 has an internal ground fault 275, the converter 110-1 shifts the whole common bus from +150 V and −150 V to either 0V and −300 V or 0V and +300 V as shown in FIG. 8. FIG. 8 is a graph of bus voltages versus time under a converter (or power supply) ground fault. All converters 110 feeding the bus 115 report a fault to the power system controller 130. In the present invention, a fault signal from each converter 110 has the time delay characterized by a time constant 2L/R$_{SENSE}$ where L is the single-leg inductance of the balun 225. The time delay introduced into the fault signal enables the power supply controllers 205 to distinguish the converter having the internal ground fault 275 from the converter 110 without the fault. The time delay in this embodiment of the invention is formed by the common-mode inductor ("balun") 225 at the output of each converter 110 and by the sensing resistor, R$_{SENSE}$. A common-mode inductor has at least two coupled windings wound on the same magnetic core. In the AC/DC converter 110, the start of one winding is connected to the voltage source 210 and the start of another winding is connected to the voltage source 215. The finish of the first winding is coupled to the anode of the diode 230 and the finish of the second winding is coupled to the cathode of the diode 235. For this connection, magnetic fields produced by the currents flowing through conductors 112 cancel each other and the resultant magnetic flux in the core is essentially zero. Operation of the balun and sensing resistor in producing the time delay is explained below for two converters that are connected in parallel to the common bus where one of the converters develops an internal ground fault. In this case, the ground fault current in the good converter flows through its sensing resistor and through one leg of its balun and returns through one leg of the balun of the failed converter thereby producing a fault signal with a time delay characterized by the 2L/R$_{SENSE}$ time constant. In the failed converter, ground fault current bypasses the balun through the ground fault and therefore the rise time of the fault signal of the failed converter is fast. Under normal operation of a converter 110, there is no current at the sensing resistor 220. The presence of voltage across the sensing resistor 220 indicates a ground fault, either internal or external. The value of the sensing resistor 220 is selected using two criteria. The first criterion puts the upper limit on the value of the sense resistor 220 so that the ground fault current limited by the resistor 220 does not interrupt operation of the power supply and does not damage the system structure. The second criterion puts the lower limit on the value of the sense resistor 220 so that the sum of ground fault currents generated by all converters 110 present in the system 100 has sufficient magnitude to activate system ground fault protection devices.

Figure 6:
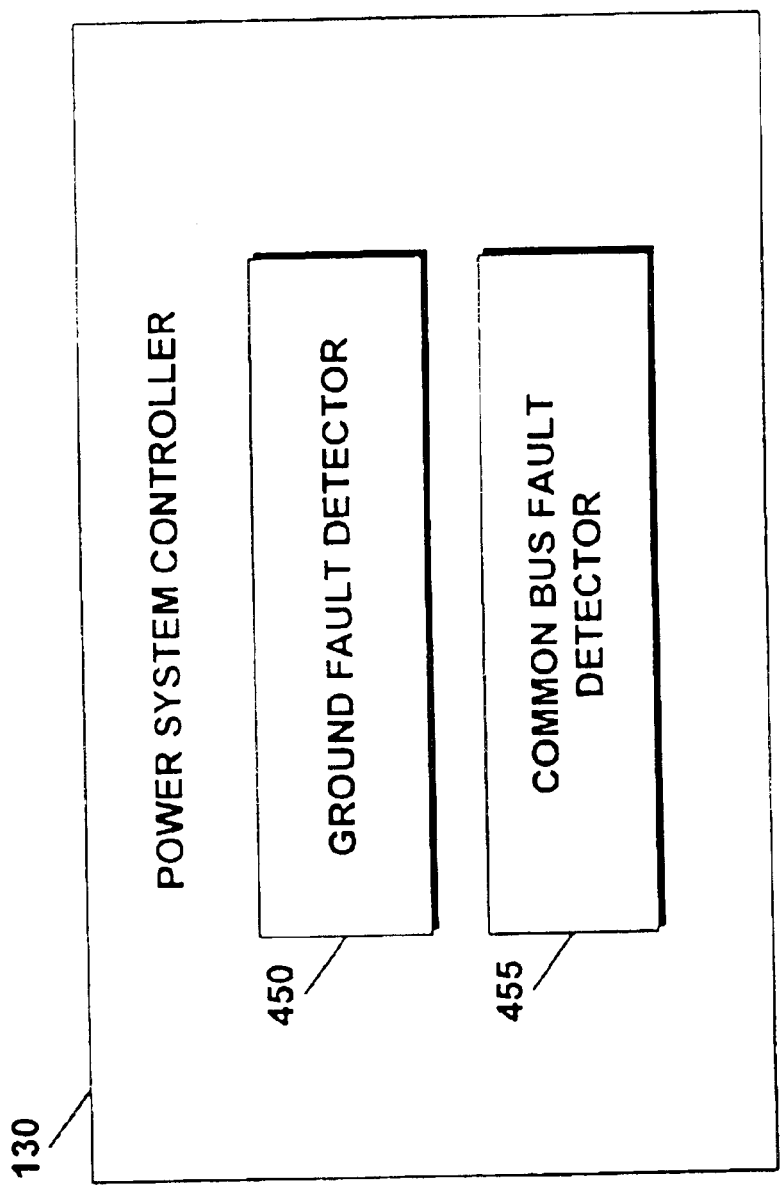
FIG. 6 is a block diagram of the power system controller of FIG. 1 according to principles of the invention.
Figure 9:
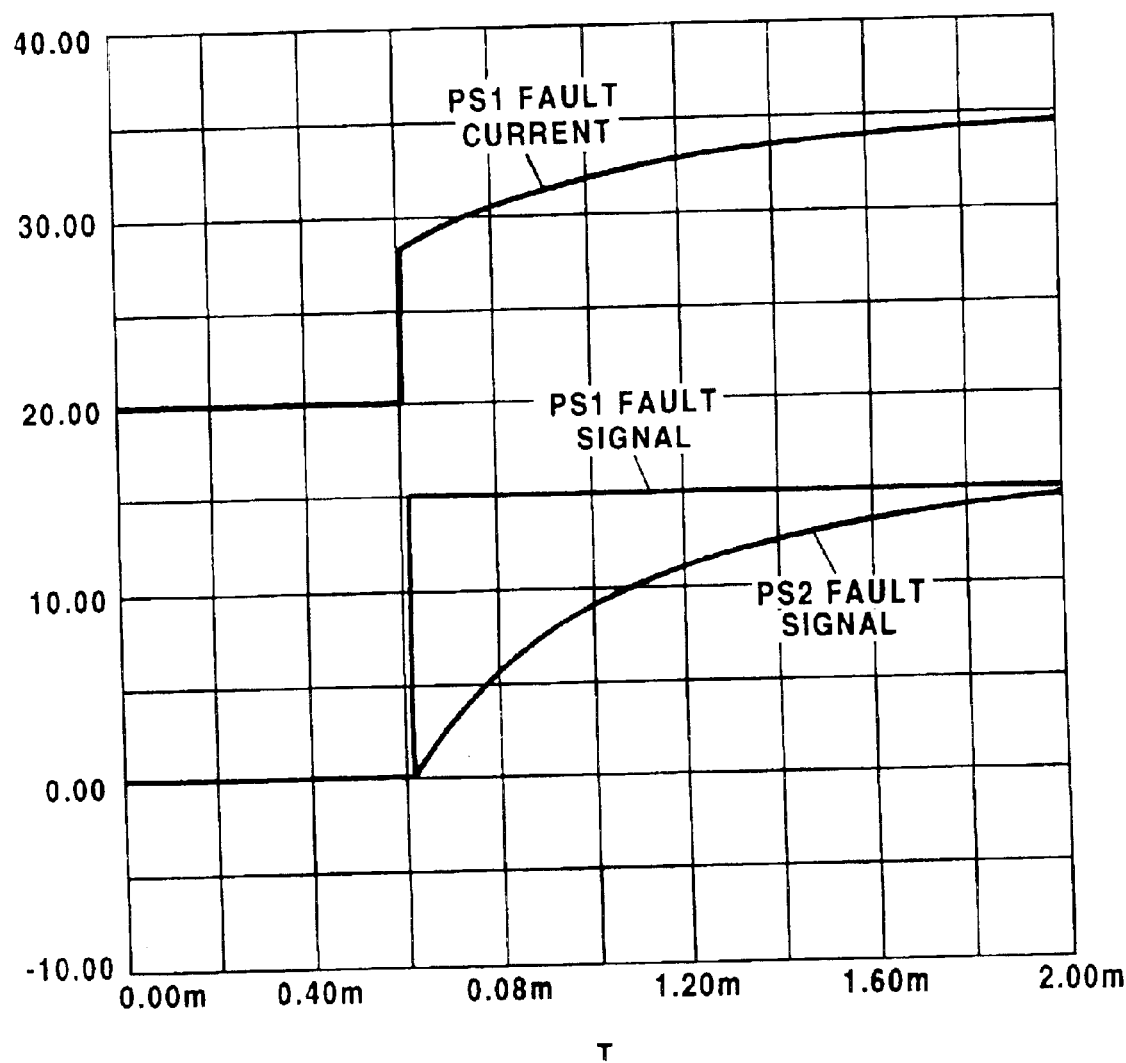
FIG. 9 is a graph of waveforms under a converter ground fault in a converter of FIG. 1.

FIG. 6 shows a block diagram of the power system controller 130 of FIG. 1. The power system controller 130 includes a ground fault detector 450 described immediately below and a common bus fault detector 455 described later below. In alternative embodiments of the invention, fault detection may be totally or partially decentralized using multiple controllers distributed throughout the power system 100. The ground fault detector 450 receives ground fault signals from the converters 110. Where there is an internal ground fault, the 2L/R$_{SENSE}$ time constant of the balun 225 and the sensing resistor 220 enables the power system controller 130 to differentiate between ground faults at the individual supply and at the common bus 115. FIG. 9 shows a graph of waveforms under a converter ground fault. FIG. 9 is a graph of wave amplitude versus time. In the case of failure of a converter 110, the failed converter's ground fault signal from the sensing resistor 220 has a faster rate of rise compared to the same signal from a good unit. Once the ground fault detector 450 in the power system controller 130 detects the faster signal of the failed unit, the power system controller 130 takes the failed unit off the bus, and the power system resumes normal operation. The fault current equals to the sum of current from all units connected to the bus.

Figure 7:
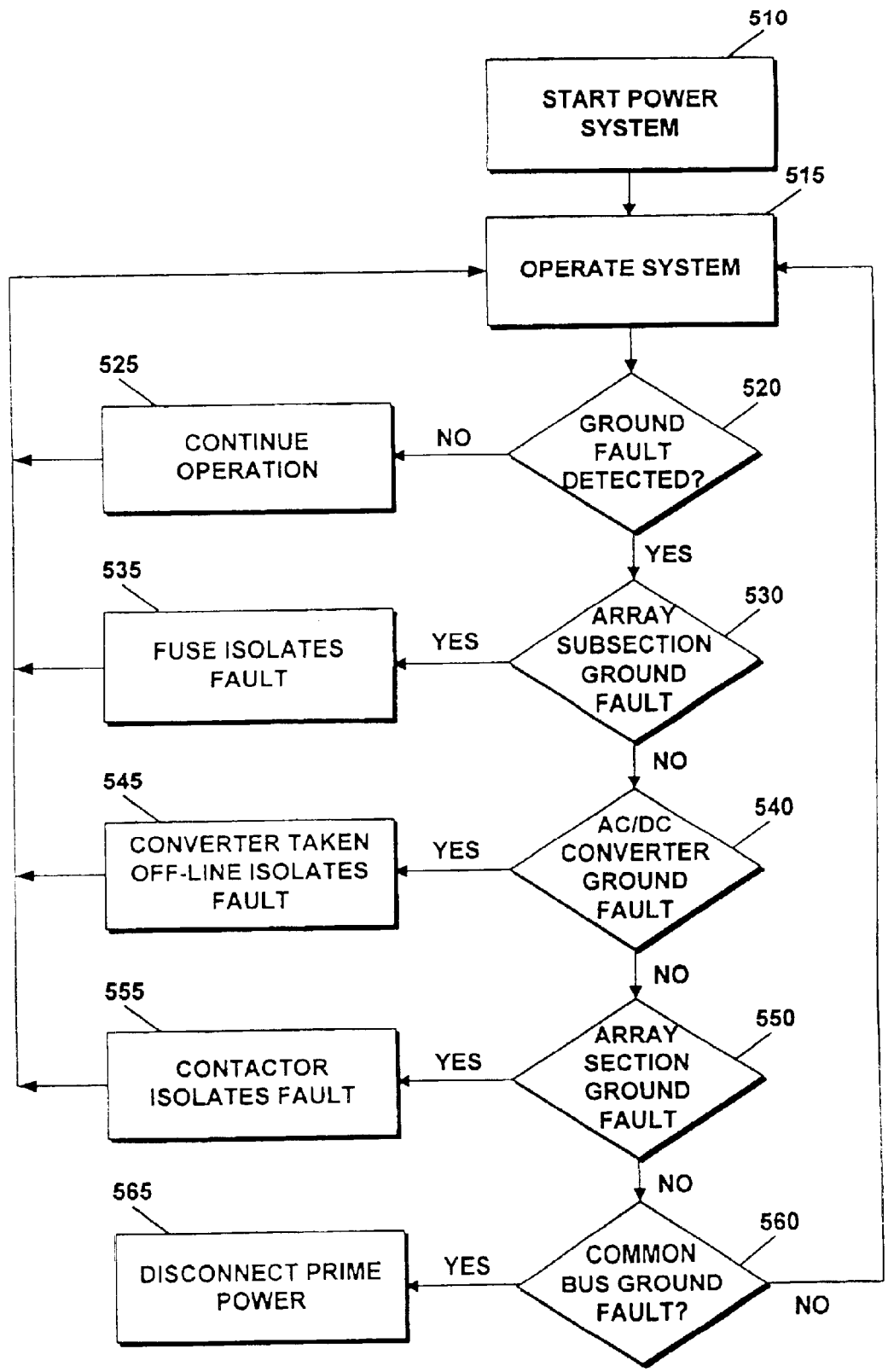
FIG. 7 is a flow chart of the operation of the power system controller of FIG. 1.
Figure 10:
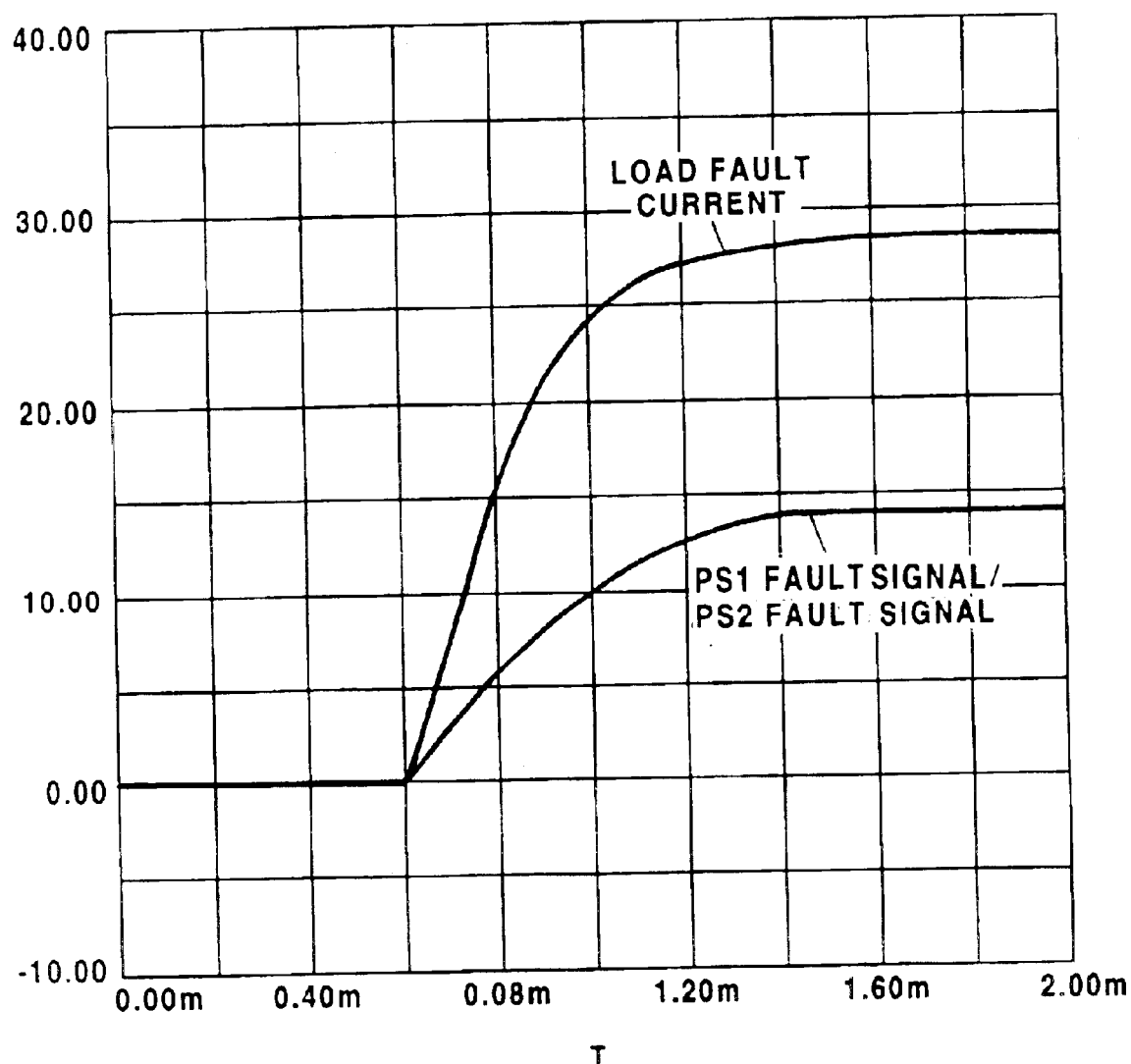
FIG. 10 is a graph of a load fault current and of a fault signal from a first converter and a fault signal from a second converter of the converters of FIG. 1.

FIG. 7 is a flow chart showing the operation of the power system controller 130. At step 510, the power system 100 is powered on. At step 515, the power system controller 130 operates. At step 520, the ground fault detector 450 monitors for ground faults. If no ground fault is detected, the power system controller 130 continues to operate, step 525. If the ground fault detector 450 detects a ground fault, the power system controller 130 proceeds to step 530. An example of an external ground fault is shown in FIG. 5 where an antenna subsection 270-1 has an external ground fault 280. In the event of a load ground fault (e.g., the "external" ground fault 280), every converter 110 generates a substantially similar slow-rising signal detected across the sensing resistor 220-1, 220-2, and the power system controller 130 does not shut down any units. The ground fault detector 450 uses the slow-rising signal as an indicator of an external ground fault (that is, a load or distribution fault) as opposed to an internal ground fault (that is, a converter fault). FIG. 9 shows a graph of a load fault current, that is, the current at the ground fault, and of a fault current measured at sensing resistor 220-1 from a first converter 110-1 and a fault signal current measured at the sensing resistor 220-2 from a second converter 110-2. FIG. 10 shows the amplitude of the signal versus time. Each converter 110-1, 110-2 provides a limited amount of ground fault current through the sensing resistor 220-1, 220-2 that does not interrupt its normal operation. The ground fault detector 450 uses the sensing resistor 220 data to further isolate the ground fault. The sensing resistor 220-1, 220-2 limits the ground fault current below the power supply over-current limit and above a fraction of the minimum current required for fault isolation. In an alternative embodiment of the invention, a voltage-clamping device is connected before the isolating diodes. The voltage-clamping device detects and isolates ground faults, but its operation relies on creating a momentary short circuit at the bus that can result in a catastrophic fault of the power system.

At 530, the power system controller 130 determines whether the ground fault is in an array subsection. At step 535, if the ground fault is in an array subsection, the fuses 255, 260 isolate the fault from the power system 100. The total current flowing through the ground fault equals to the sum of currents of individual power supplies. Therefore, the protective devices 255-1, 255-2, 260-1, 260-2 (fuses or circuit breakers) are sized to interrupt the total ground fault current provided by all power supplies connected to the common bus 115.

If the ground fault is not in an array subsection, the power system controller proceeds to step 540 where the power system controller 130 determines whether the ground fault is in one of the converters 110. If the ground fault is in one of the converters 110, the power system controller 130 proceeds to step 545, where the power system controller 130 determines which converter 110 has the fault and turns the converter 110 off in order to isolate the fault from the rest of the power system 100. A ground fault in a converter 110 is an internal ground fault and does not cause the failed converters to exhibit the slow-rising signal described above.

If the ground fault is not in a converter, the power system controller 130 proceeds to step 550, where the power system controller 130 determines whether the ground fault is in an array section. At step 555, if the ground fault is in an array section, then a contactor 600 (FIG. 11) in a capacitor bank 120 coupled to the array section isolates the fault.

If the ground fault is not in an array section, then the power system controller 130 proceeds to step 560, where the power system controller 130 determines whether the ground fault is in the common bus. If there is no ground fault in the common bus, the power system controller proceeds to step 515 and continues operation. If there is a common bus ground fault, then the power system controller 130 proceeds to step 565 where it disconnects prime power so that the power system 100 can be repaired.

Figure 11:
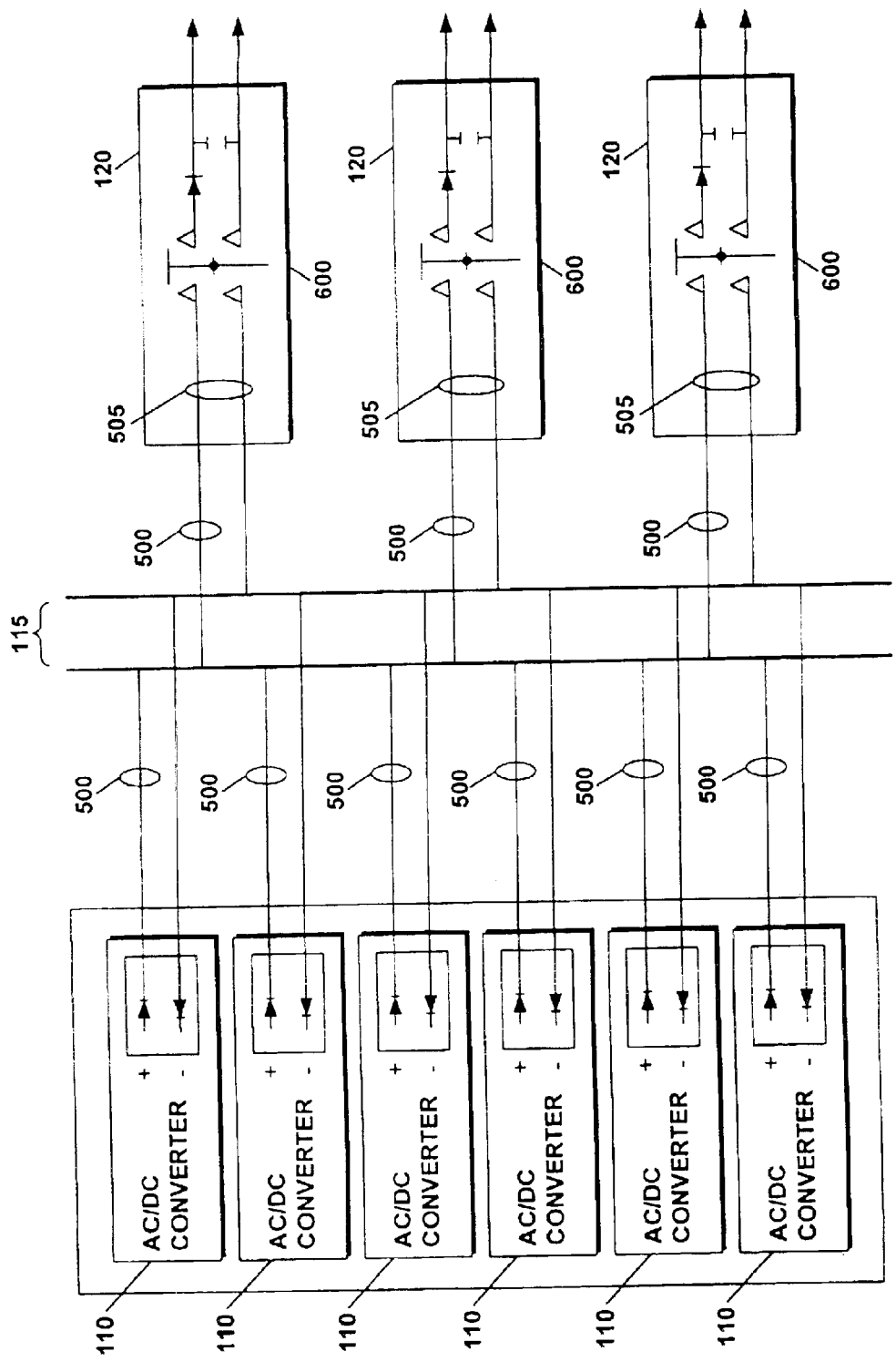
FIG. 11 is a block diagram of a portion of the power system of FIG. 1 including Hall effect sensors to detect a bus fault according to principles of the invention; and, FIG. 12 is a block diagram of a generalized system according to principles of the invention having a plurality of power converters and a plurality of loads coupled to a common bus.

Further details of the power system of FIG. 1 will now be explained with reference to FIG. 11. FIG. 11 is a block diagram of the AC/DC converters 110 and the common bus 115 that feeds the array 125 through the capacitor banks 120. First Hall effect current sensors 500 are placed on all the common bus positive inputs from AC/DC converters 110 and positive outputs to capacitor banks 120. In an alternative embodiment of the invention, the first Hall effect sensors 500 are placed on the negative inputs from the AC/DC converters and the negative outputs to the capacitor banks 120. Second Hall effect sensors 500 are placed at the positive and negative inputs from the common bus 115 in the capacitor banks 120. Each capacitor bank 120 has a contactor 600, which is a type of switch, used, as described above to isolate ground fault detected by the ground fault detector 450.

The first Hall effect sensors feed signals to the bus fault detector 455. The bus fault detector 455 subtracts the sum of the bus input signals from sum of the bus output signals. Under normal operating conditions, the result of this subtraction is zero because under "no fault" operating conditions the current flowing into the common bus 115 equals the current flowing out of the common bus 115. A fault on the common bus 15 is indicated when input current to the common bus 115 does not equal output current from the common bus 115. The second Hall effect sensors 505 are ground fault Hall effect current sensors and are used in the capacitor bank assemblies to detect a ground fault located between the capacitor banks 120 and the antenna array 125. Normally, equal current flows through each leg of a capacitor bank 120 and the output of the ground fault Hall effect sensor 505 is zero because the currents flow in opposite directions through it. When a ground fault occurs between a capacitor bank 120 and an antenna array 125, more current flows in one capacitor bank leg than the other and the ground fault Hall effect sensor 505 sends an output signal to the bus fault detector 455.

Figure 12:
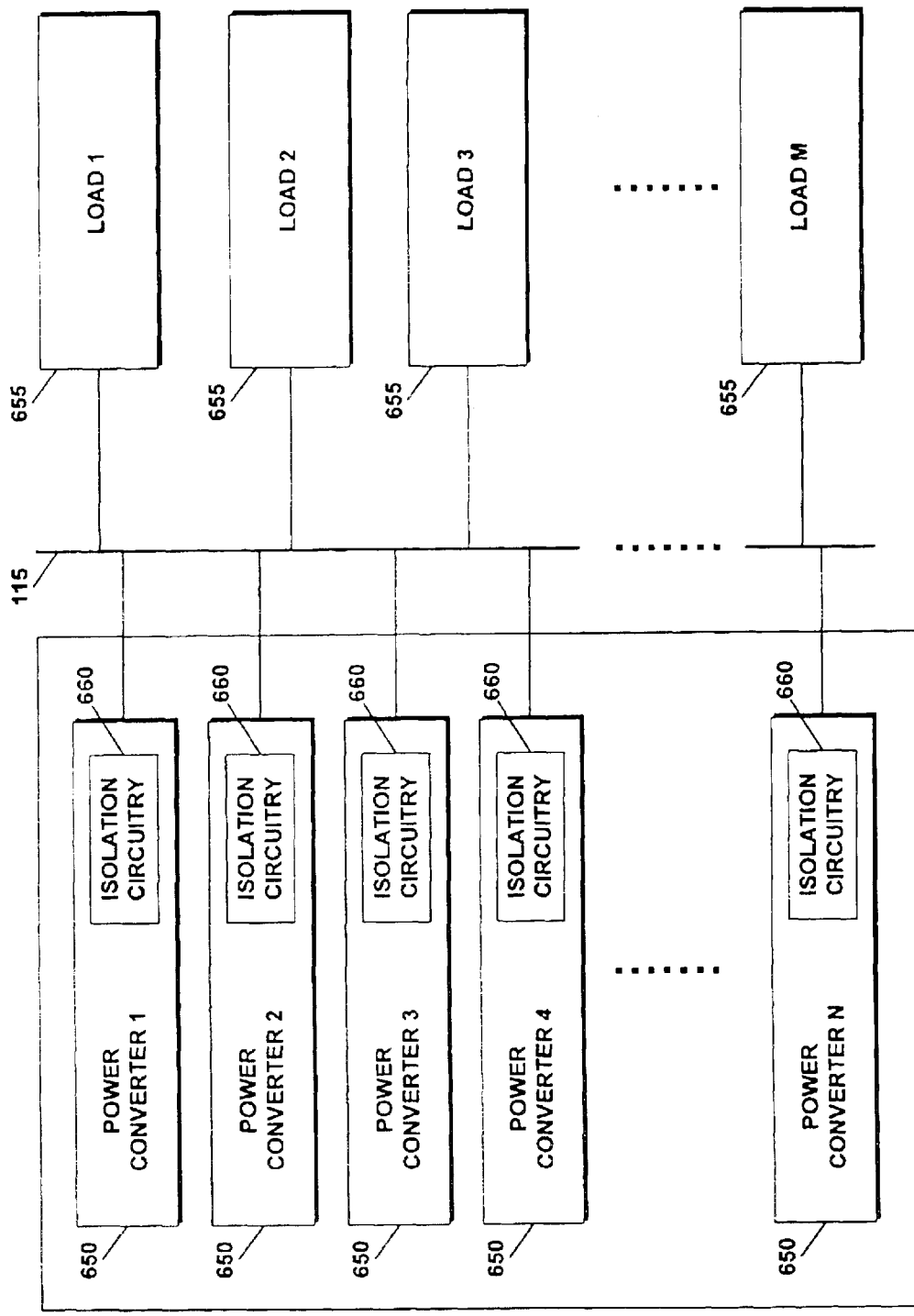

FIG. 12 shows a generalized system having a partial power system with a plurality of power converters 650, power converters 1-N, and a plurality of loads 655, loads 1-M, coupled to the common bus 115. Each power converter 650 has isolation circuitry 660 through which the power converter 650 is coupled to the common bus 115. The invention described with regard to FIGS. 1–11 above can be successfully implemented in any system where multiple converters are coupled to a common bus. For example, the invention may be implemented using any type of power converter including AC/AC converters, DC/DC converters, AC/DC converters and DC/AC converters. For a power converter 650 having a DC output, the isolation circuitry 660 comprises diodes as shown in FIG. 1. For a power converter 650 having an AC output, the isolation circuitry 660 is a composite switch, typically a diode combined with a transistor. The present invention is also not limited to a load of a phased-array radar antenna but may be used to provide power to other types of loads.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A power system for a radar antenna, comprising:
   a multiphase transformer;
   a common bus; and
   a plurality of power converters coupled in parallel to said multiphase transformer and said common bus, each said power converter having a multisloped power output characteristic to enable power sharing by said plurality of power converters.

2. The power system of claim 1, wherein each of said power converters comprises:
   an output voltage loop controller;
   an output power loop controller;
   an output current loop controller,
   where said output voltage loop controller, said output power loop controller and said output current loop controller together provide said multi-sloped power output characteristic, each of said power converters providing:
      a constant voltage when in a voltage mode controlled by said output voltage loop controller,
      a constant power output when in a constant power mode controlled by said output power loop controller, and
      a constant current when in a current mode controlled by said output current loop controller.

3. The power system of claim 2, wherein one of said plurality of power converters operates to provide power to the radar antenna when in said constant voltage mode and wherein at least one of said plurality of power converters operate to provide constant power to the radar antenna when in said constant power mode.

4. The power system of claim 1, wherein said common bus is a substantially balanced bus with respect to ground.

5. The power system of claim 4, wherein said common bus is substantially balanced at +150 V and −150 V.

6. The power system of claim 1, wherein each of said power converters includes a ground fault detection circuit having a sensing resistor to detect current resulting from a ground fault.

7. The power system of claim 6 wherein said ground fault detection circuit further includes time delay devices to provide a time delay in a current detection signal to a power system controller generated in response to a current at said sensing resistor, the time delay to distinguish a current detection signal from a power converter having a ground fault from a power converter without a ground fault.

8. The power system of claim 7, wherein said time delay devices delay a current detection signal from said power converter without a ground fault so that a current detection signal from said power converter having a ground fault has a faster rate of rise.

9. The power system of claim 7, wherein said time delay devices comprise a balun and a sensing resistor.

10. The power system of claim 6, wherein a fast-rising signal from said sensing resistor indicates that a corresponding power converter has failed thereby signaling to the power system to take said corresponding power converter off-line.

11. The power system of claim 6, wherein each said ground fault detection system of each power converter generates a current in response to an external ground fault, said currents to combine into a combined ground fault detection current, said power system further comprising a fuse characterized and located to fail when said fuse receives said combined ground fault detection current.

12. The power system of claim 1 further comprising:
a first Hall effect sensor at an input of said common bus to sense input current to said common bus and a second Hall effect sensor at an output of said common bus to detect output current from said common bus; and
a common bus fault detector in a power system controller in said power system to monitor said first Hall effect sensor and said second Hall effect sensor to determine a difference between said input current and said output current to detect a fault in said common bus.

13. The power system as in claim 1, wherein the multiphase transformer includes multiple output signals that feed the power converters; and
wherein the power converters convert power from the multiple output signals and share a burden of providing power to the common bus.

14. The power system as in claim 13, wherein each of the power converters supplies substantially the same amount of power to the common bus.

15. The power system as in claim 14, wherein each of the power converters produces a DC (Direct Current) output that feeds the common bus.

16. The power system as in claim 15, wherein each of the power converters includes i) fault detection circuitry to detect an occurrence of a failure associated with a respective power converter, and ii) isolation circuitry to isolate the respective power converter from the common bus during the occurrence of a failure.

17. The power system as in claim 1, wherein the radar antenna is a phased array antenna.

18. A power supply for a power system for a radar antenna, comprising:
an output voltage loop controller;
an output power loop controller;
an output current loop controller,
where said output voltage loop controller, said output power loop controller and said output current loop controller together provide a multi-sloped power output characteristic, said power supply to provide:
a constant voltage in a constant voltage mode controlled by said output voltage loop controller,
an increasing current while voltage decreases in a constant power mode controlled by said output power loop controller, and
a constant current in a constant current mode controlled by said output current loop controller.

19. The power supply of claim 18, wherein each of said power converters includes a ground fault detection circuit having a sensing resistor to detect current resulting from a ground fault.

20. The power supply of claim 19, wherein the ground fault detection circuit further includes time delay devices to provide a time delay in a current detection signal to a power system controller generated in response to a current at said sensing resistor, the time delay to distinguish a current detection signal from a power converter having a ground fault from a power converter without a ground fault.

21. The power supply of claim 20, wherein the time delay devices delay a current detection signal from a corresponding power converter without a ground fault so that a current detection signal from said corresponding power controller having a ground fault has a faster rate of rise.

22. The power supply of claim 19, wherein a fast-rising signal from said sensing resistor indicates that said converter has failed thereby signaling to the power system to take said corresponding power converter off-line.

23. The power system as in claim 18, wherein the radar antenna is a phased array antenna.

24. A method of supplying power from a plurality of power converters to a radar antenna, each converter of the plurality having a voltage loop controller, a power loop controller, and a current loop controller, the method comprising the steps of:
providing power from one power converter of said plurality by controlling said plurality of power converters by the voltage loop controllers until power required by the radar antenna causes an output feedback voltage of said one power converter to exceed a voltage limit;
providing power from at least two power converters of said plurality of power converters by controlling said plurality of converters with the power loop controllers until power required by the radar antenna exceeds a power limit for said at least two power converters; and
providing a constant current from the plurality of power converters by controlling said plurality of power converters by the current loop controllers.

25. The method of claim 24 wherein the step of providing power from at least two power converters in constant power mode further comprises the steps of initially providing power from a first converter having a highest output voltage converter, and then as a voltage output level of the first converter decreases in constant power mode, providing power from another power converter of said plurality of power converters having a second highest output voltage.

26. The method as in claim 24, wherein the radar antenna is a phased array antenna.

27. A power system for a load coupled to a common bus, comprising:
  a plurality of power converters coupled in parallel to the common bus, each power converter including
  (a) an output voltage loop controller;
  (b) an output power loop controller; and
  (c) an output current loop controller,
  where said output voltage loop controller, said output power loop controller and said output current loop controller together provide said multi-sloped power output characteristic, each said power converter to provide
    a constant voltage in a voltage mode controlled by said output voltage loop controller,
    an increasing current while voltage is decreasing in a constant power mode controlled by said output power loop controller, and
    a constant current in a current mode controlled by said output current loop controller,
      whereby said plurality of power converters cooperate to balance the power provided to the load among said plurality of power converters.

28. The power system as in claim 27, wherein each of the power converters generates a respective power converter output signal coupled to provide power to the common bus, the power converters sharing a burden of providing power to the common bus.

29. The power system as in claim 27, wherein the load is a phased array antenna.

30. A power supply providing power to a variable load, the power supply comprising:
  an output voltage loop controller;
  an output power loop controller; and
  an output current loop controller,
  wherein a combination of i) the output voltage loop controller, ii) the output power loop controller, and iii) the output current loop controller supports multiple power conversion modes depending on characteristics of the variable load, the power supply providing:
    a constant voltage output when in a constant voltage mode controlled by said output voltage loop controller,
    a constant power output when in a constant power mode controlled by said output power loop controller, and
    a constant current output when in a constant current mode controlled by said output current loop controller.

31. A method of supplying power from a power converter to a variable load, the method comprising:
  measuring a power converter output voltage and power converter output current of the power converter;
  controlling the power converter using a voltage loop controller to provide a substantially constant voltage i) while the power converter output voltage is greater than a first voltage threshold and less than a power converter output voltage without a load on the power converter, and ii) while output current is greater than zero and less than a first current threshold, during which the power converter powers a relatively light load;
  controlling the power converter using a power loop controller to provide substantially constant power i) while the output voltage is greater than a second voltage threshold and less than the first voltage threshold and ii) while output current is greater than the first current threshold and less than a second current threshold, during which the power converter powers a relatively heavy load;
  controlling the converter using a current loop controller to provide substantially constant current i) while the output voltage is greater than a third voltage threshold and less than the second voltage threshold and ii) while output current is greater than the second current threshold and less than a third current threshold, during which the converter operates at substantially constant current when the load on the power converter attempts to exceed a power limit associated with the power converter; and
  controlling the converter using a foldback circuit while the output voltage is greater than zero and less than the third threshold voltage, during which the power converter recovers from an overload condition.

32. A power system for providing power to a variable load, the power system comprising:
  a plurality of power converters to convert received power signals into corresponding power converter output signals that feed a common bus, the plurality of power converters sharing a burden of feeding power to the common bus; and
  each of the power converters including an independent control circuit to support generating a respective power converter output signal feeding the common bus, the independent control circuit of a respective power converter supporting multiple power converter output modes which are activated depending on characteristics of the load.

33. A power system as in claim 32, wherein the independent control circuit of a respective power converter includes:
  an output voltage loop controller;
  an output power loop controller;
  an output current loop controller,
  wherein a combination of i) the output voltage loop controller, ii) the output power loop controller, and iii) the output current loop controller supports the multiple power converter output modes depending on characteristics of the variable load, the respective power converter providing:
    a constant voltage output when in a constant voltage mode controlled by said output voltage loop controller,
    a constant power output when in a constant power mode controlled by said output power loop controller, and
    a constant current output when in a constant current mode controlled by said output current loop controller.

* * * * *